(12) United States Patent
Todorovic

(10) Patent No.: US 10,476,894 B2
(45) Date of Patent: Nov. 12, 2019

(54) EVALUATING INSTALLERS AND INSTALLER PAYLOADS

(71) Applicant: Sophos Limited, Abingdon (GB)

(72) Inventor: Rade Todorovic, Abingdon (GB)

(73) Assignee: Sophos Limited, Abingdon (GB)

( * ) Notice: Subject to any disclaimer, the term of this patent is extended or adjusted under 35 U.S.C. 154(b) by 0 days.

(21) Appl. No.: 15/045,741

(22) Filed: Feb. 17, 2016

(65) Prior Publication Data

US 2017/0237754 A1    Aug. 17, 2017

(51) Int. Cl.
*H04L 29/06* (2006.01)
*H04L 9/32* (2006.01)
*G06F 21/00* (2013.01)
*H04L 9/00* (2006.01)

(52) U.S. Cl.
CPC .......... *H04L 63/1416* (2013.01); *G06F 21/00* (2013.01); *H04L 9/006* (2013.01); *H04L 9/3247* (2013.01); *H04L 63/0823* (2013.01); *H04L 63/123* (2013.01); *H04L 63/20* (2013.01)

(58) Field of Classification Search
CPC ... H04L 63/0823; H04L 63/12; H04L 63/126; H04L 63/1416; H04L 63/1433; H04L 63/145; H04L 63/20; H04L 9/3247; H04L 63/123; H04L 9/006; G06F 21/51; G06F 21/53; G06F 21/57; G06F 21/561–566; G06F 21/00; G06F 21/52; G06F 21/552

See application file for complete search history.

(56) References Cited

U.S. PATENT DOCUMENTS

| 6,092,194 A | 7/2000 | Touboul et al. |
| 8,935,792 B1 * | 1/2015 | Spurlock ................. G06F 21/52 726/25 |
| 2008/0016339 A1 * | 1/2008 | Shukla .................... G06F 21/53 713/164 |
| 2010/0154026 A1 * | 6/2010 | Chatterjee ............. G06F 21/126 726/1 |

(Continued)

OTHER PUBLICATIONS

IPO, "UK Application No. 1701020.8 Search Report dated Jul. 10, 2017", 5 pages.

*Primary Examiner* — Yogesh Paliwal
*Assistant Examiner* — Chi D Nguy
(74) *Attorney, Agent, or Firm* — Strategic Patents, P.C.

(57) ABSTRACT

A reputation of an installer may be determined based on contextual information including its source (e.g., its publisher), a cryptographic signature or certificate, a process that carried out its download, a user that initiated its download, whether the installer has been previously vetted by a security policy, and so forth. A corresponding reputation may then be inferred for each of the computer objects contained within the installer, such that the reputation remains with the computer objects if/when they are unpacked on an endpoint. Each of the computer objects may then be unpacked for individual analysis (e.g., a static analysis) regarding each object's compliance with a security policy, thereby producing a second reputation for each computer object. A decision whether to execute the installer/objects, e.g., during an installation process, may then be made by reconciling the reputation of the installer and the second reputation for each computer object.

19 Claims, 7 Drawing Sheets

(56) References Cited

U.S. PATENT DOCUMENTS

| | | | |
|---|---|---|---|
| 2012/0066346 A1* | 3/2012 | Virmani | G06F 17/3012 |
| | | | 709/219 |
| 2012/0090025 A1 | 4/2012 | Milner et al. | |
| 2013/0185799 A1* | 7/2013 | Pfeifer | G06F 21/57 |
| | | | 726/24 |
| 2014/0259004 A1 | 9/2014 | Devarajan et al. | |
| 2015/0264077 A1* | 9/2015 | Berger | G06F 21/554 |
| | | | 726/23 |
| 2016/0180084 A1* | 6/2016 | Spurlock | G06F 21/552 |
| | | | 726/23 |
| 2016/0182550 A1* | 6/2016 | Spurlock | H04L 63/1425 |
| | | | 726/23 |

\* cited by examiner

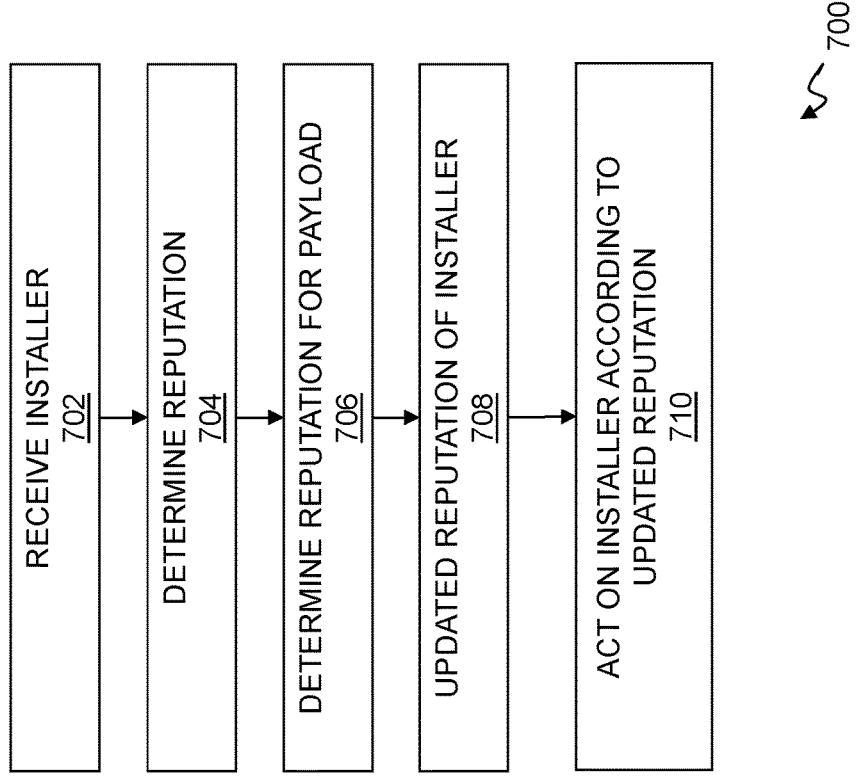

EVALUATING INSTALLERS AND INSTALLER PAYLOADS

TECHNICAL FIELD

This application relates to evaluating installers and installer payloads.

BACKGROUND

Installers typically include payloads of files that are unpacked onto a local computer for installation. Installers can be checked for compliance with a security policy, e.g., a security policy of an enterprise that includes the local computer receiving the payload, often by tracking the behavior of the installer through files that are accessed, opened, and produced at runtime. An application control (AC) solution may be configured to detect when an executable or other file is being opened by the installer, and to allow or block the action of opening or running that file to comply with a security policy. However, at the point when the file is being accessed, the AC solution may not necessarily know contextual information regarding the file, e.g., why the file is present and why the file is being accessed. Because of this lack of contextual knowledge, the quality of a run/block decision by the AC solution may be compromised, leading to false positive or false negative decisions. There is a need for improved techniques for evaluating installers and installer payloads.

SUMMARY

A reputation of an installer may be determined based on contextual information including its source (e.g., its publisher), a cryptographic signature or certificate, a process that carried out its download, a user that initiated its download, whether the installer has been previously vetted by a security policy, and so forth. A corresponding reputation may then be inferred for each of the computer objects contained within the installer, such that the reputation remains with the computer objects if/when they are unpacked on an endpoint. Each of the computer objects may then be unpacked for individual analysis (e.g., a static analysis) regarding each object's compliance with a security policy, thereby producing a second reputation for each computer object. A decision whether to execute the installer/objects, e.g., during an installation process, may then be made by reconciling the reputation of the installer and the second reputation for each computer object.

In an aspect, a method for evaluating computer objects supplied in an installer for unpacking and execution on a computing device includes: receiving an installer containing one or more packed computer objects on an endpoint; determining a reputation of the installer; unpacking each of the packed computer objects on the endpoint to provide one or more unpacked computer objects; associating the reputation of the installer with each of the one or more unpacked computer objects as a first reputation; analyzing each of the unpacked computer objects to evaluate compliance with a security policy and provide a second reputation; and, for each of the one or more unpacked computer objects, reconciling the first reputation and the second reputation to a reconciled reputation. The method may also include providing a determination regarding whether to permit or deny execution of each of the one or more unpacked computer objects on the endpoint based on the reconciled reputation, and based on the determination, permitting or denying execution of each of the one or more unpacked computer objects on the endpoint.

Implementations may include one or more of the following features. Analyzing each of the unpacked computer objects may include performing a static analysis of one or more of the unpacked computer objects. Analyzing each of the unpacked computer objects may include determining a signature for one or more of the unpacked computer objects. The signature may be a checksum. Analyzing each of the unpacked objects may include retrieving the second reputation from a remote database. Analyzing each of the unpacked computer objects may include an evaluation of a publisher reputation for one or more of the unpacked computer objects. Analyzing each of the unpacked computer objects may include an evaluation of a certificate or cryptographic signature associated with one or more of the unpacked computer objects. The method may further include monitoring execution of each of the unpacked computer objects for possible security threats or compliance with the security policy. The method may further include updating the reputation of the installer when monitoring execution leads to a detection of a security threat or non-compliance with the security policy. Monitoring execution of each of the unpacked computer objects may take place in at least one of a sandboxed environment, a virtualized environment, or an emulated environment. The method may further include updating the reputation of the installer when the second reputation indicates noncompliance with the security policy or detection of a security threat. Determining the reputation of the installer may include determining a source of the installer and using the source to determine the reputation. The source of the installer may be determined from one or more of a signature, a certificate, and a location on a network. Reconciling the first reputation and the second reputation may include prioritizing the first reputation of the installer when the first reputation indicates a trusted vendor. Reconciling the first reputation and the second reputation may include prioritizing the second reputation of one of the unpacked objects when the second reputation indicates known malicious code. One of the unpacked objects may be a second installer.

Another aspect includes a computer program product comprising non-transitory computer executable code embodied in a non-transitory computer readable medium that, when executing on one or more computing devices, performs the steps of: receiving an installer containing one or more packed computer objects; determining a reputation of the installer; unpacking each of the packed computer objects to provide one or more unpacked computer objects; associating the reputation of the installer with each of the one or more unpacked computer objects as a first reputation; analyzing each of the unpacked computer objects to evaluate compliance with a security policy and provide a second reputation based on security policy compliance; and, for each of the one or more unpacked computer objects, reconciling the first reputation and the second reputation to a reconciled reputation. The steps performed by the computer executable code may also include providing a determination regarding whether to permit or deny execution of each of the one or more unpacked computer objects on a device based on the reconciled reputation, and based on the determination, permitting or denying execution of each of the one or more unpacked computer objects on the device.

Yet another aspect includes a system for evaluating computer objects supplied in an installer for unpacking and execution on a computing device. The system may include a processor and a non-transitory computer-readable medium comprising computer executable instructions. The instructions, when executing on the processor, may perform operations including receiving an installer containing one or more packed computer objects, determining a first reputation of the installer, determining a second reputation of a payload of the installer, and updating the first reputation of the installer based on the second reputation of the payload for the installer.

Implementations may include one or more of the following features. Determining the first reputation may include calculating a signature for the installer. Determining the first reputation may include evaluating a source of the installer. Determining the second reputation may include calculating a signature for one or more software objects packed in the payload. Determining the second reputation may include calculating a signature for one or more software objects unpacked from the payload. Determining the second reputation may include performing a behavior analysis of one or more software objects unpacked from the payload. Determining the second reputation may include executing one or more software objects unpacked from the payload in a sandbox. Updating the first reputation of the installer based on the second reputation of the payload for the installer may include changing the first reputation to match the second reputation.

Another aspect includes a computer program product comprising non-transitory computer executable code embodied in a non-transitory computer readable medium that, when executing on one or more computing devices, performs the steps of: receiving an installer containing one or more packed computer objects; determining a first reputation of the installer; determining a second reputation of a payload of the installer; and updating the first reputation of the installer based on the second reputation of the payload for the installer.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 7 is a flow chart of a method for evaluating computer objects supplied in an installer.

DETAILED DESCRIPTION

Embodiments will now be described with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as limiting terms unless expressly state otherwise.

Figure 1:
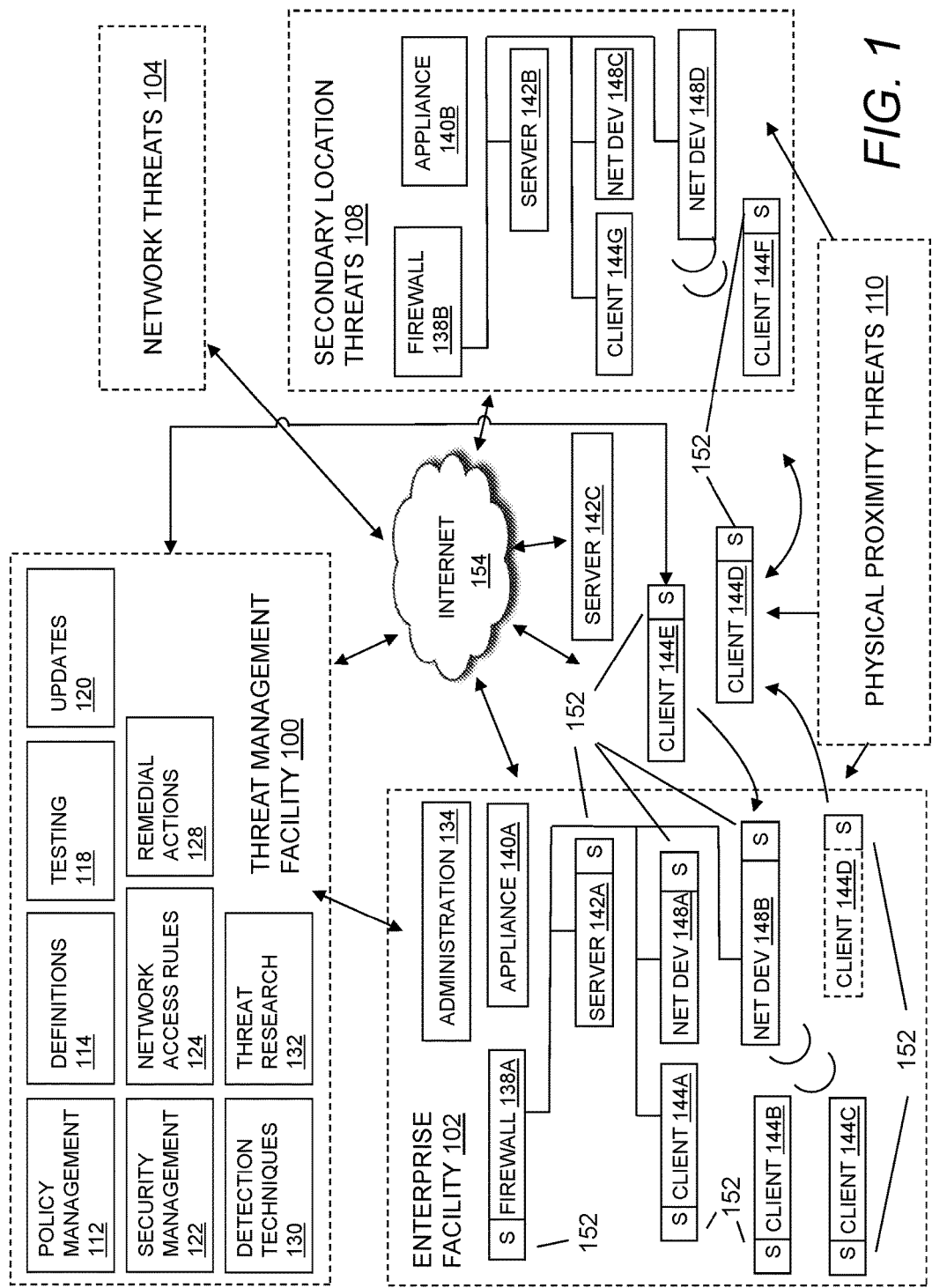
FIG. 1 illustrates an environment for threat management.

FIG. 1 illustrates an environment for threat management. Specifically, FIG. 1 depicts a block diagram of a threat management system providing protection to an enterprise against a plurality of threats—a context in which the following techniques may usefully be deployed. One aspect relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. We will now turn to a description of certain capabilities and components of the threat management system 100.

Over recent years, malware has become a major problem across the Internet 154. From both a technical perspective and a user perspective, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. It will be understood that any reference herein to client facilities may include the clients 144A-D shown in FIG. 1 and vice-versa. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include clients 144D (or client facilities) that have moved into network connectivity not directly associated or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

The security management facility 122 may provide email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

The security management facility 122 may provide host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach endpoint computers and the like.

The security management facility 122 may provide reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

The security management facility 122 may support overall security of the enterprise facility 102 network or set of enterprise facility 102 networks, e.g., by providing updates of malicious code information to the enterprise facility 102 network and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or otherwise distributed. The security management facility 122 may manage the receipt of malicious code descriptions from a provider, distribution of the malicious code descriptions to enterprise facility 102 networks, distribution of the malicious code descriptions to client facilities, and so forth.

The threat management facility 100 may provide a policy management facility 112 that may be able to block non-malicious applications, such as VoIP, instant messaging, peer-to-peer file-sharing, and the like, that may undermine productivity and network performance within the enterprise facility 102. The policy management facility 112 may be a set of rules or policies that may indicate enterprise facility 102 access permissions for the client facility, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility. For example, there may be a rule that does not permit access to sporting websites. When a website is requested by the client facility, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM activity to only support personnel for communicating with customers. This may allow communication for departments requiring access, but may maintain the network bandwidth for other activities by restricting the use of IM to only the personnel that need access to instant messaging (IM) in support of the enterprise facility 102. In an embodiment, the policy management facility 112 may be a stand-alone application, may be part of the network server facility 142, may be part of the enterprise facility 102 network, may be part of the client facility, or the like.

The threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

The threat management facility 100 may also provide for the removal of applications that potentially interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a quickly evolving malware environment may require timely updates, and thus an update management facility 120 may be provided by the threat management facility 100. In addition, a policy management facility 112 may also require update management (e.g., as provided by the update facility 120 herein described). The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

The security facility 122 and policy management facility 112 may push information to the enterprise facility 102 network and/or client facility. The enterprise facility 102 network and/or client facility may also or instead pull information from the security facility 122 and policy management facility 112 network server facilities 142, or there may be a combination of pushing and pulling of information between the security facility 122 and the policy management facility 112 network servers 142, enterprise facility 102 network, and client facilities, or the like. For example, the enterprise facility 102 network and/or client facility may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility by providing notification that there are updates available for download and then transmitting the information. The combination of the security management 122 network server facility 142 and security update module may function substantially the same as the policy management facility 112 network server and policy update module by providing information to the enterprise facility 102 network and the client facility in a push or pull method. In an embodiment, the policy management facility 112 and the security facility 122 management update modules may work in concert to provide information to the enterprise facility's 102 network and/or client facility for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The definition files may contain a number of commands, definitions, or instructions, to be parsed and acted upon, or the like. In embodiments, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an embodiment, the client facility may request an update to the definition files from an update facility 120 within the network, may request updated definition files from a computing facility external to the network, updated definition files may be provided to the client facility 114 from within the network, definition files may be provided to the client facility from an external computing facility from an external network, or the like.

A definition management facility 114 may provide timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In embodiments, the network may receive definition files and distribute the definition files to the network client facilities, the client facilities may receive the definition files directly, or the network and client facilities may both receive the definition files, or the like. In an embodiment, the definition files may be updated on a fixed periodic basis, on demand by the network and/or the client facility, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide controlled access to the enterprise facility 102 networks. For instance, a manager of the enterprise facility 102 may want to restrict access to certain applications, networks, files, printers, servers, databases, or the like. In addition, the manager of the enterprise facility 102 may want to restrict user access based on certain criteria, such as the user's location, usage history, need to know, job position, connection type, time of day, method of authentication, client-system configuration, or the like. Network access rules may be developed for the enterprise facility 102, or pre-packaged by a supplier, and managed by the threat management facility 100 in conjunction with the administration facility 134.

A network access rules facility 124 may be responsible for determining if a client facility application should be granted access to a requested network location. The network location may be on the same network as the facility or may be on another network. In an embodiment, the network access rules facility 124 may verify access rights for client facilities from within the network or may verify access rights of computer facilities from external networks. When network access for a client facility is denied, the network access rules facility 124 may send an information file to the client facility containing. For example, the information sent by the network access rules facility 124 may be a data file. The data file may contain a number of commands, definitions, instructions, or the like to be parsed and acted upon through the remedial action facility 128, or the like. The information sent by the network access facility rules facility 124 may be a command or command file that the remedial action facility 128 may access and take action upon.

The network access rules facility 124 may include databases such as a block list, a black list, an allowed list, a white list, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites, controlling instant messenger accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may retrieve predefined rule sets from a remote provider of a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may perform or initiate a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may include monitoring the enterprise facility 102 network or endpoint devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, server facility 142, administration facility 134, firewall 138, gateway, hubs and routers 148, threat management appliance 140, desktop users, mobile users, and the like. In embodiments, it may be the endpoint computer security facility 152, located on a computer's desktop, which may provide threat protection to a user, and associated enterprise facility 102. In embodiments, the term endpoint may refer to a computer system that may source data, receive data, evaluate data, buffer data, or the like (such as a user's desktop computer as an endpoint computer), a firewall as a data evaluation endpoint computer system, a laptop as a mobile endpoint computer, a personal digital assistant or tablet as a hand-held endpoint computer, a mobile phone as an endpoint computer, or the like. In embodiments, endpoint may refer to a source or destination for data, including such components where the destination is characterized by an evaluation point for data, and where the data may be sent to a subsequent destination after evaluation. The endpoint computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the endpoint computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the endpoint computer security facility 152 is adapted. A client facility computing platform may be a computer system that is able to access a service on another computer, such as a server facility 142, via a network. This client facility server facility 142 model may apply to a plurality of networked applications, such as a client facility connecting to an enterprise facility 102 application server facility 142, a web browser client facility connecting to a web server facility 142, an e-mail client facility retrieving e-mail from an Internet 154 service provider's mail storage servers 142, and the like. In embodiments, traditional large client facility applications may be switched to websites, which may increase the browser's role as a client facility. Clients 144 may be classified as a function of the extent to which they perform their own processing. For instance, client facilities are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients 144 may include CURI, Delphi, Droplets, Java, win32, X11, and the like. Thin clients 144 may offer minimal processing capabilities, for instance, the thin client facility may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility may also be a mix of the two, such as processing data locally, but relying on a server facility 142 for data storage. As a result, this hybrid client facility may provide benefits from both the fat client facility type, such as multimedia support and high performance, and the thin client facility type, such as high manageability and flexibility. In embodiments, the threat management facility 100, and associated endpoint computer security facility 152, may provide seamless threat protection to the plurality of clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility connections in order to service requests from clients 144. The server facility 142 application may run on the same computer as the client facility using it, or the server facility 142 and the client facility may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In some embodiments, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an endpoint computer security facility 152. These appliances may provide interconnection services within the enterprise facility 102 network, and therefore may advance the spread of a threat if not properly protected.

A client facility may be protected from threats from within the enterprise facility 102 network using a personal firewall, which may be a hardware firewall, software firewall, or combination of these, that controls network traffic to and from a client. The personal firewall may permit or deny communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an endpoint computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network." Since firewall facilities 138 represent boundaries between threat levels, the endpoint computer security facility 152 associated with the firewall facility 138 may provide resources that may control the flow of threats at this enterprise facility 102 network entry point. Firewall facilities 138, and associated endpoint computer security facility 152, may also be associated with a network node that may be equipped for interfacing between networks that use different protocols. In embodiments, the endpoint computer security facility 152 may provide threat protection in a plurality of network infrastructure locations, such as at the enterprise facility 102 network entry point, e.g., the firewall facility 138 or gateway; at the server facility 142; at distribution points within the network, e.g., the hubs and routers 148; at the desktop of client facility computers; and the like. In embodiments, the most effective location for threat detection may be at the user's computer desktop endpoint computer security facility 152.

The interface between the threat management facility 100 and the enterprise facility 102, and through the appliance facility 140 to embedded endpoint computer security facilities, may include a set of tools that may be the same for all enterprise implementations, but allow each enterprise to implement different controls. In embodiments, these controls may include both automatic actions and managed actions. Automatic actions may include downloads of the endpoint computer security facility 152 to components of the enterprise facility 102, downloads of updates to existing endpoint computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Client facilities connected to the enterprise facility 102 network via a wired facility 148A or wireless facility 148B may receive similar protection, as both connection types are ultimately connected to the same enterprise facility 102 network, with the same endpoint computer security facility 152, and the same threat protected enterprise facility 102 environment. Mobile wireless facility clients 144B-F, because of their ability to connect to any wireless 148B,D network access point, may connect to the Internet 154 outside the enterprise facility 102, and therefore outside the threat-protected environment of the enterprise facility 102. In this instance the mobile client facility (e.g., the clients 144 B-F), if not for the presence of the endpoint computer security facility 152 may experience a malware attack or perform actions counter to enterprise facility 102 established policies. In addition, there may be a plurality of ways for the threat management facility 100 to protect the out-of-enterprise facility 102 mobile client facility (e.g., the clients 144 D-F) that has an embedded endpoint computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile the client facilities may receive the same interactions to and from the threat management facility 100 as client facilities inside the enterprise facility 102, where the mobile client facilities may be considered a virtual extension of the enterprise facility 102, receiving all the same services via their embedded endpoint computer security facility 152.

Interactions between the threat management facility 100 and the components of the enterprise facility 102, including mobile client facility extensions of the enterprise facility 102, may ultimately be connected through the Internet 154. Threat management facility 100 downloads and upgrades to the enterprise facility 102 may be passed from the firewalled networks of the threat management facility 100 through to the endpoint computer security facility 152 equipped components of the enterprise facility 102. In turn the endpoint computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, websites, e-mail, IM, VoIP, application software, and the like. These threats may attempt to attack a mobile enterprise client facility (e.g., the clients 144B-F) equipped with an endpoint computer security facility 152, but in embodiments, as long as the mobile client facility is embedded with an endpoint computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the client facility's 144 endpoint computer security facility 152 may manage actions in unprotected network environments such as when the client facility (e.g., client 144F) is in a secondary location 108 or connecting wirelessly to a non-enterprise facility 102 wireless Internet connection, where the endpoint computer security facility 152 may dictate what actions are allowed, blocked, modified, or the like. For instance, if the client facility's 144 endpoint computer security facility 152 is unable to establish a secured connection to the threat management facility 100, the endpoint computer security facility 152 may inform the user of such, and recommend that the connection not be made. In the instance when the user chooses to connect despite the recommendation, the endpoint computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the endpoint computer security facility 152 may perform specific actions to remediate possible threat incursions or policy violations during or after the unprotected connection.

The secondary location 108 may have no endpoint computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the enterprise facility's 102 client facility, such as through a USB port, or in physical proximity with the enterprise facility's 102 client facility such that a wireless facility connection can be established, such as through a Bluetooth connection. These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at a secondary location 108, and the like. A mobile device, once connected to an unprotected computer resource, may become a physical proximity threat 110. In embodiments, the endpoint computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Having provided an overall context for threat detection, the description now turns to a brief discussion of an example of a computer system that may be used for any of the entities and facilities described above.

Figure 2:
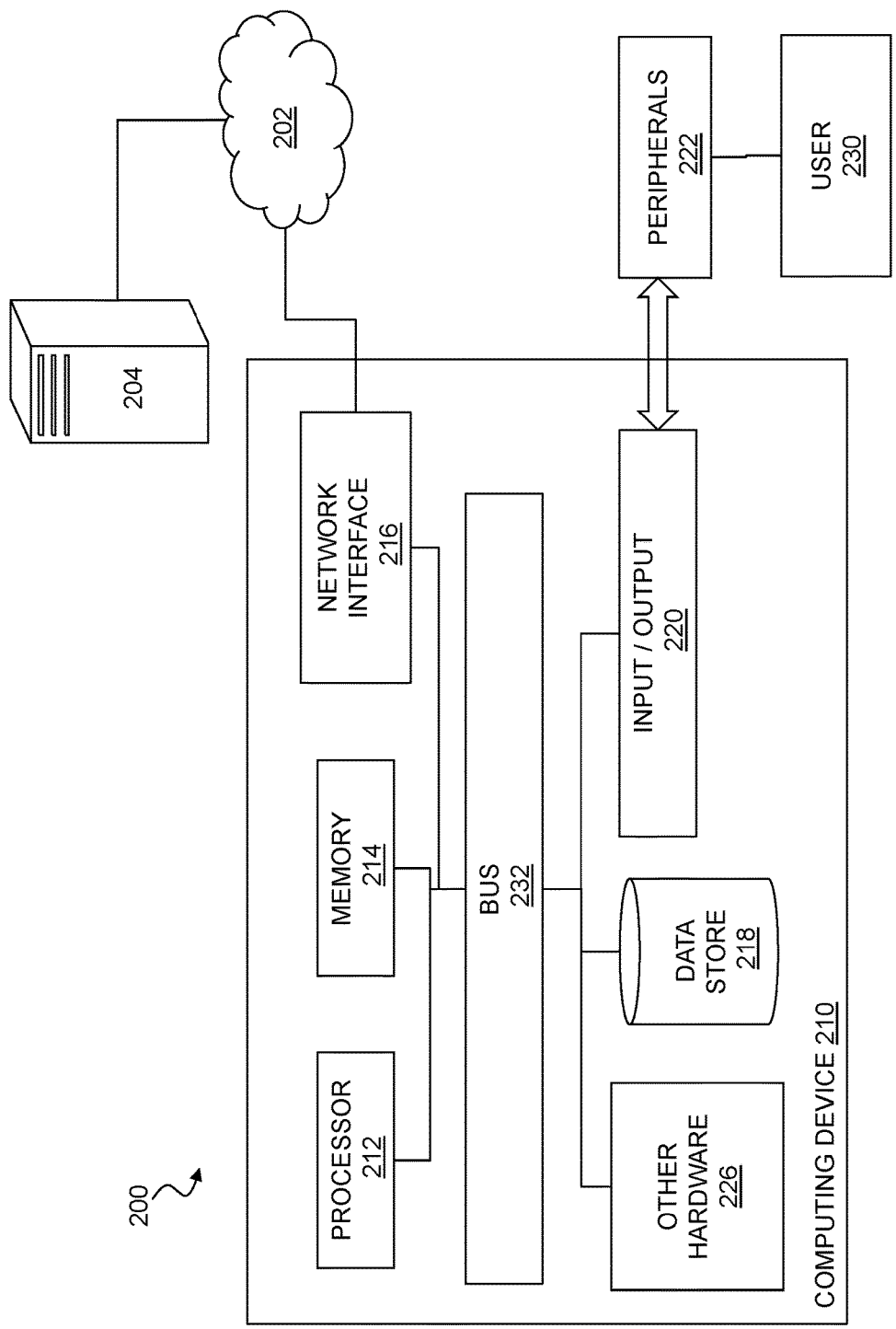
FIG. 2 illustrates a computer system.

FIG. 2 illustrates a computer system. In general, the computer system 200 may include a computing device 210 connected to a network 202, e.g., through an external device 204. The computing device 210 may be or include any type of network endpoint or endpoints as described herein, e.g., with reference to FIG. 1 above. For example, the computing device 210 may include a desktop computer workstation. The computing device 210 may also or instead be any suitable device that has processes and communicates over a network 202, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or may be disposed on a server.

The computing device 210 may be used for any of the entities described in the threat management environment described above with reference to FIG. 1. For example, the computing device 210 may be part of or may include a server, a client an enterprise facility, a threat management facility, or any of the other facilities or computing devices described therein. In certain aspects, the computing device 210 may be implemented using hardware or a combination of software and hardware, and the computing device 210 may be a standalone device, a device integrated into another entity or device, a platform distributed across multiple entities, or a virtualized device executing in a virtualization environment.

The network 202 may include any network described above, e.g., data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, a data store 218, and one or more input/output devices 220. The computing device 210 may further include or be in communication with peripherals 222 and other external input/output devices 224.

The processor 212 may be any as described herein, and in general be capable of processing instructions for execution within the computing device 210 or computer system 200. The processor 212 may include a single-threaded processor or a multi-threaded processor. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 200 and configuring the computing device 200 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 200 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store without limitation one or more of the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

A peripheral 222 may include any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control or communication to other devices or components. Other I/O devices suitable for use as a peripheral 222 include haptic devices, three-dimensional rendering systems, augmented-reality displays, and so forth. In one aspect, the peripheral 222 may serve as the network interface 216, such as with a USB device configured to provide communications via short range (e.g., BlueTooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid state device, or an optical drive, a magnetic drive, a disk drive, or other device or combination of devices suitable for bulk storage. More generally, any device or combination of devices suitable for use with the computing device 200 may be used as a peripheral 222 as contemplated herein.

Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200 such as the processor 212, memory 214, network interface 216, other hardware 226, data store 218, and input/output interface. As shown in the figure, each of the components of the computing device 210 may be interconnected using a system bus 232 or other communication mechanism for communicating information.

Methods and systems described herein may be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Having provided an overall context for threat detection and a computer system, the description now turns to devices, systems, and methods for evaluating installers and installer payloads. Evaluating installer and installer payloads may be used in addition to, in conjunction with, or to supplement the threat detection systems described above. In another aspect, the devices, systems, and methods for evaluating installers and installer payloads are separate from any threat detection system such as those described above.

The term "installer" as used herein shall include installers typical in the art of software and computer science, e.g., specialized data configurations used for doing whatever is needed for the installation of a computer program, e.g., applications, packages, archives, drivers, other software, and so forth, on an endpoint. An installer may include one or more installer payloads. An installer payload may include computer objects that are copied or generated from the payload and placed onto the endpoint (e.g., a computing device like computing device 210 discussed with reference to FIG. 2 above) for access by the operating system (OS)

during the installation of a computer program. An installer payload may include instructions (e.g., scripts, executable code, configuration information, or instructions) for installing computer objects. An installer may include instructions (e.g., scripts, executable code, configuration information, or instructions) that may be used by one or more applications or to direct one or more applications to install an installer payload. An installer application may be contained in an installer payload that is separate from application(s) to be installed. An installer may include more than one installer payload or more than one installer application. An installer application may already be installed on a target device, for example as part of an operating system. An installer application may be installed by an installer. An installer may include one or more executable applications for unpacking and installing an installer payload. An installer payload may be included in, or otherwise be part of, an application that is included in an installer. An installer may cause one or more nested installers to be unpacked or installed.

The installers evaluated herein may also or instead include any 'container' or compressed types of files, e.g., self-extracting files, archive format files (e.g., zip files), package files of various types, and so forth. Thus, in general, the installers may include files with contents of all kinds that could contain threats or otherwise be undesired in a network or on an endpoint.

Evaluating installers may be accomplished through tracking the behavior of the installer. However, tracking the behavior of an installer may be a complex operation because an application control (AC) product may function by blocking access to certain binaries (e.g., executables, shared libraries, etc.), where its underlying purpose is to control access to certain applications, and the correspondence of applications to binaries is many-to-many. Thus, installer tracking typically includes complex, dynamic monitoring of the installer chain that requires frequent updating. Further, evaluating installers using conventional techniques may be difficult because the context for computer objects placed onto an endpoint is typically not known to an AC product. In this manner, computer objects may be unpacked and then subsequently evaluated solely based on their behavior, without the context that the computer object originated from an installer. Also, assigning a reputation to the computer objects at the runtime of the installer may be fragile (e.g., new installers may behave differently), difficult (e.g., because it involves low-level interception code), resource-intensive (e.g., happens at runtime), and OS specific. Moreover, although scanning each computer object using a threat analysis library or the like may enable the identification and reporting of known malicious objects, these scans typically cannot make decision on unknown objects.

The devices, systems, and methods discussed herein may include determining a reputation for an installer and inferring the reputation for each of the computer objects contained within the installer such that the reputation remains with the computer objects if/when they are unpacked on an endpoint. Each of the computer objects may then be unpacked for individual analysis, where another reputation is determined for each object. A decision whether to execute the computer objects may then be made using the combination of these reputations.

Using implementations, computer objects contained within the installer may be individually whitelisted/blacklisted such that when they are encountered in a different context (e.g., through another installer, or by the OS outside of the original installation process) they may be regarded as safe or unsafe (or otherwise allowed or blocked). In this manner, the reputation of the individual computer objects of an installer may be propagated from a known context to another context that otherwise might not be known. Thus, implementations can provide for improved AC solutions using these techniques.

Instead of simply scanning for malware (or compliance/noncompliance with a security policy), implementations may use container decomposition features of a security engine (such as those described above with reference to FIG. 1) to extract each computer object contained within an installer and calculate a unique signature from the computer object content, e.g., a Secure Hash Algorithm (SHA) checksum. This allows a signature to be created at the point of download before the computer object has been permanently unpacked to a disc, e.g., during a subsequent install operation. In this manner, information only available prior to an installation operation (e.g., at the time of downloading) may be inherited by each computer object and saved to a disc (e.g., in a database) at that time. This information may be looked up whenever one of the computer objects is accessed at a later time after being unpacked from the installer.

Figure 3:
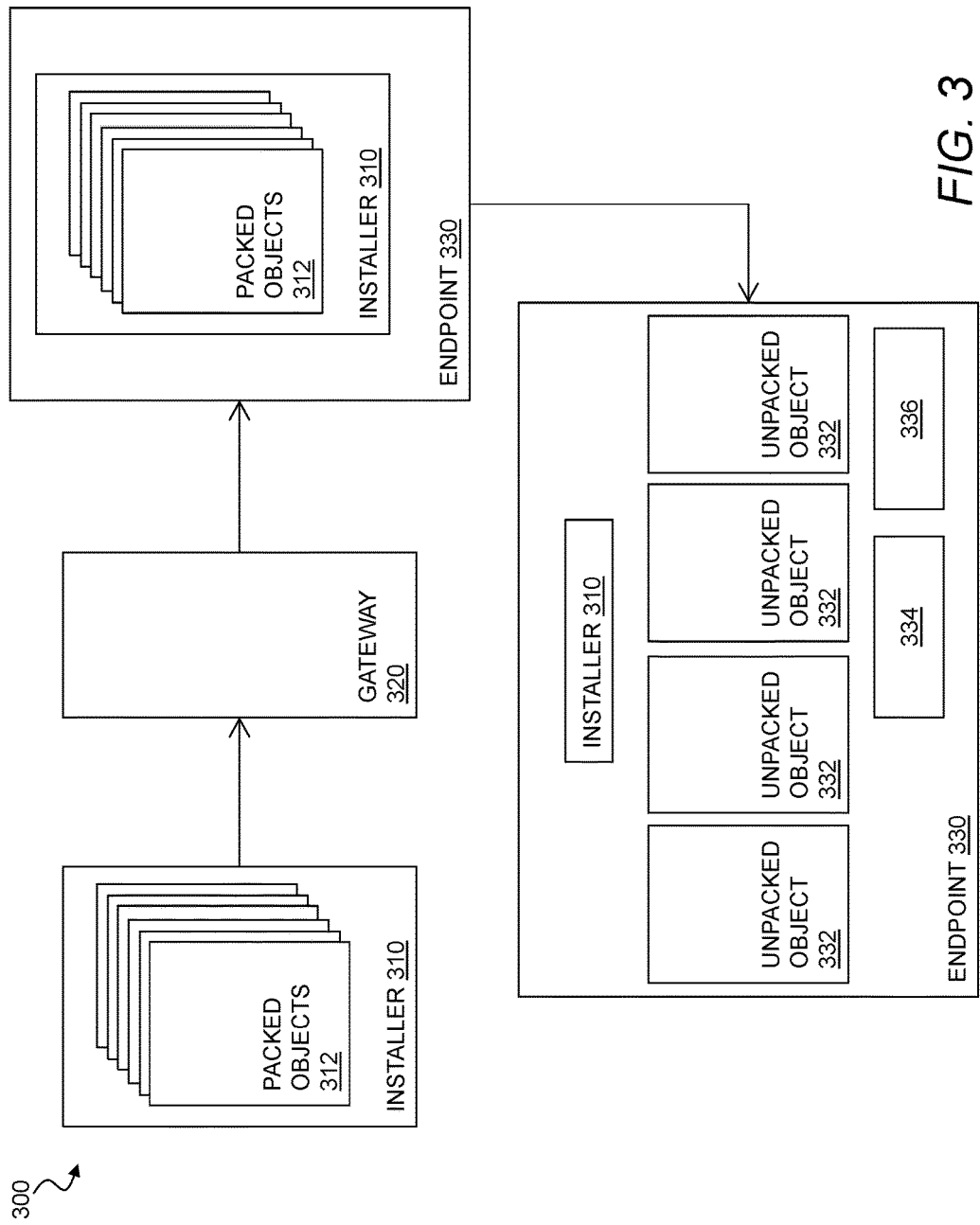
FIG. 3 illustrates an installer process for a system.

FIG. 3 illustrates an installer process for a system. The system 300 may include an installer 310, a gateway 320, and an endpoint 330.

The installer 310 may include one or more packed computer objects 312, such as files, executables, archives, applications, packages, drivers, software, dynamic link libraries (DLL), other installers, and so forth disposed within a compressed file or the like in or with the installer 310. The packed computer objects 312 may be configured for unpacking or extracting from the installer 310 onto an endpoint 330 where they may be accessed and/or executed for the installation of a computer program onto the endpoint 330.

The gateway 320 may be disposed as an intermediary between the endpoint 330 and the source of the installer 310, e.g., the Internet (e.g., a website, an electric mail message, and so on), an outside network, a local area network (LAN), a network resource, another endpoint, a removable drive, and so forth. In an aspect, the gateway 320 includes a firewall, e.g., to another endpoint/computer or to a network (e.g., a LAN, an enterprise network, and so forth). The gateway 320 may also or instead include without limitation one or more of a web gateway, an electronic mail gateway, a network switch, a threat management facility, an enterprise facility, a computing device, a router, or any other network device or the like positioned between the endpoint 330 and remote resources. The gateway 320 or components in communication with the gateway 320 may perform one or more of the analyses discussed herein. In one aspect, the gateway 320 is programmed to independently perform some or all of the steps contemplated herein for evaluating reputation of installers and so forth. The gateway 320 may also or instead perform these steps in cooperation with a threat management facility such as any of the threat management facilities described herein.

Thus, the gateway 320 may generally assist in determining or identifying one or more reputations, signatures, certificates, identifiers, and so forth for installer 310 and other computer objects. In an aspect, the gateway 320 determines a reputation of the installer 310 and then makes a determination as to whether to block or allow the installer 310 from proceeding to the endpoint 330 based on the reputation. Then, once the installer 310 is received on the endpoint 330, further analyses may be performed (e.g., analyzing the one or more packed computer objects 212).

The gateway 320 may also or instead analyze the one or more packed computer objects 312 applying analysis as generally described herein.

The endpoint 330 may be any of the endpoints discussed herein, e.g., with reference to FIG. 1. The endpoint 330 may also or instead include any of the computing devices discussed herein, e.g., with reference to FIG. 2, and may for example include client devices such as a computer or computer system, a laptop, a Personal Digital Assistant (PDA), a mobile phone, a smart phone, a tablet, or any other mobile or fixed computing device. More generally, any device suitable for connection to a data network and participating in an enterprise network or the like may be an endpoint 330 as contemplated herein. Other network elements such as a firewall or server may be endpoints in certain contexts, such as where a firewall acts as a data evaluation endpoint computer system or a server hosts one or more virtual machines. In general, the endpoint 330 may be protected by the gateway 320, which monitors and conditionally forwards traffic between the endpoint 330 and other resources connected to a network, using, e.g., firewall rules or other security policies or the like.

The installer 310 may be received by the endpoint 330, e.g., from the gateway 320 or otherwise. The installer 310 may include or have a first reputation associated therewith, e.g., which is provided by an analysis (e.g., on the gateway 320, an analysis facility, the endpoint 330, etc.), retrieved from a database, or otherwise determined.

Once received, the one or more packed computer objects 312 may be unpacked on the endpoint 330 to provide one or more unpacked computer objects 332. The unpacked computer objects 332 may be unpacked in a secure location on the endpoint 330, e.g., a sandbox or the like, where an analysis may be performed to determine a second reputation for each of the unpacked computer objects 332. The combination of the first reputation and the second reputation may be used to determine whether to run the installer/objects on the endpoint 330. It is noted that the reputations may include each reputation individually, a reconciliation or combination of these reputations, a combination of these reputations and other reputation information, or any combination of the foregoing, any of which may be generally useful in evaluating the reputation of software objects as contemplated herein.

In some embodiments, the one or more packed computer objects 312 are unpacked outside of the endpoint 330, e.g., at the gateway 320, at an analysis facility, or otherwise. Regardless of where they are unpacked, an analysis may be performed on each of the unpacked computer objects 332 to evaluate compliance with a security policy and provide a reputation for each of the unpacked computer objects (e.g., a second reputation).

The analysis may be performed by the endpoint 330 (e.g., a processor 334 and a memory 336 on the endpoint 330) or another participant in the system 300 in communication with the endpoint 330, e.g., the gateway 320, an analysis facility, a scanning engine, a security facility, or any other enterprise network security resource or the like. Thus, even though the analyses may be described as performed by one component of the system 300 (e.g., an analysis facility), in some implementations, the analyses may also or instead be performed by other components of the system 300, or combinations of components such as any of the various local and remote threat management resources described above. In some implementations, a server that is remote from the endpoint 330 and the gateway 320 conducts the analysis.

Figure 4:
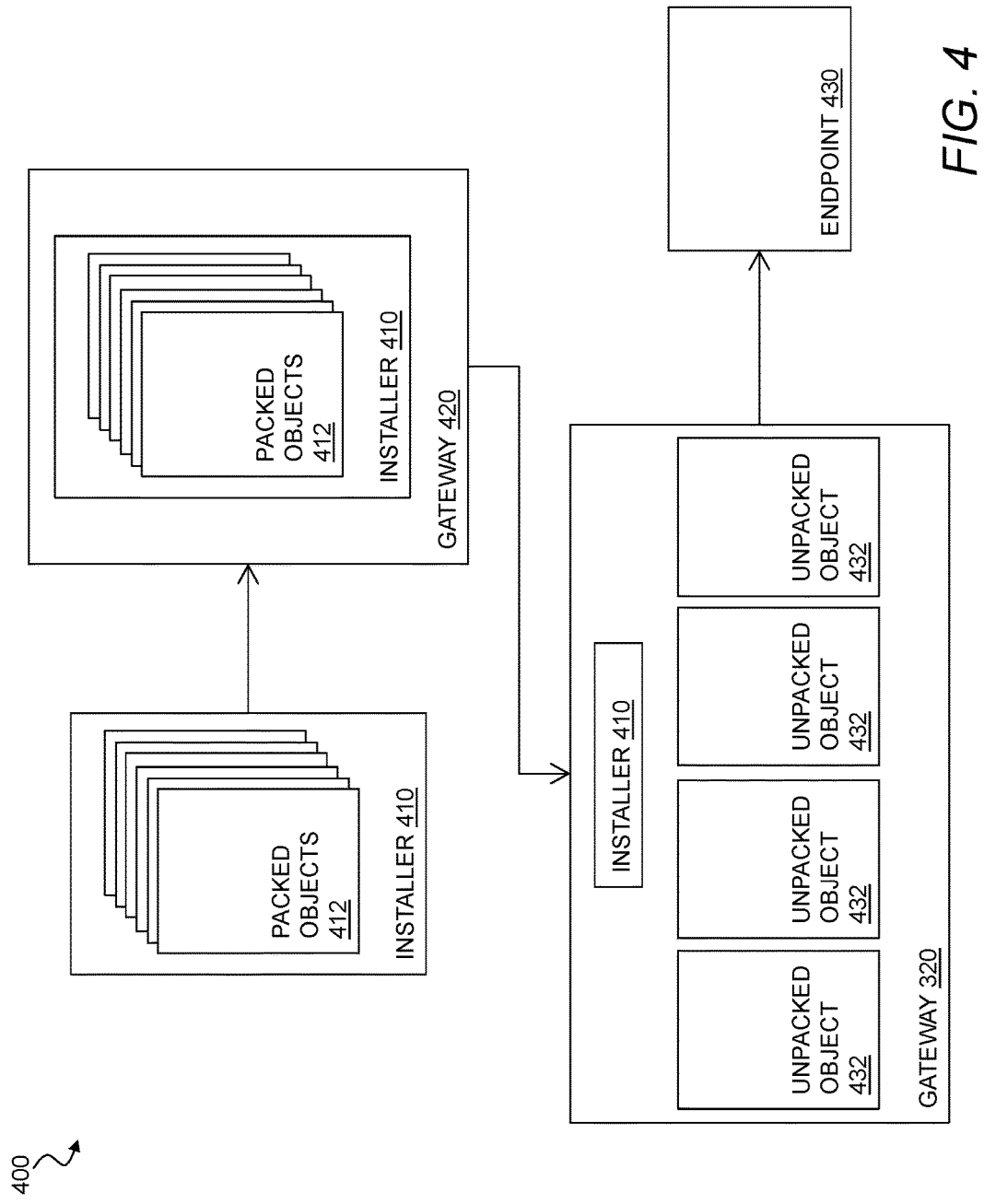
FIG. 4 illustrates an installer process for a system.

FIG. 4 illustrates an installer process for a system. The system 400 may include an installer 410, a gateway 420, and an endpoint 430.

As shown in the figure, the installer 410 may include one or more packed objects 412 that may be received by the gateway 420. The gateway 420 may then unpack the packed objects 412 from the installer 410 thereby creating a plurality of unpacked objects 432 accessible to the gateway 320. In some implementations, the installer 410 may be unpacked by or on the endpoint 430 (as demonstrated by FIG. 3 above) or the installer 410 may be unpacked by or on the gateway 420 (as demonstrated by FIG. 4). In other embodiments, the installer 410 may be unpacked elsewhere, such as on a system separate from or remote from the gateway, e.g., on an analysis facility or the like.

In addition to unpacking the installer 410, the gateway 420 may perform one or more of the analyses discussed herein. For example, the gateway 420 may be programmed to independently perform some or all of the steps contemplated herein for evaluating the reputation of installers 410 and so forth. To this end, the gateway 420 may generally assist in determining or identifying one or more reputations, signatures, certificates, identifiers, and so forth for the installer 410 and other computer objects. In an aspect, the gateway 420 determines a reputation of the installer 410 and then makes a determination as to whether to block or allow the installer 410 from proceeding to the endpoint 430 based on the reputation. Once the installer 410 is received on the endpoint 430, further analyses may be performed (e.g., analyzing the one or more packed computer objects 412). The gateway 420 may also or instead analyze the computer objects, e.g., applying analyses as generally described herein.

Figure 5:
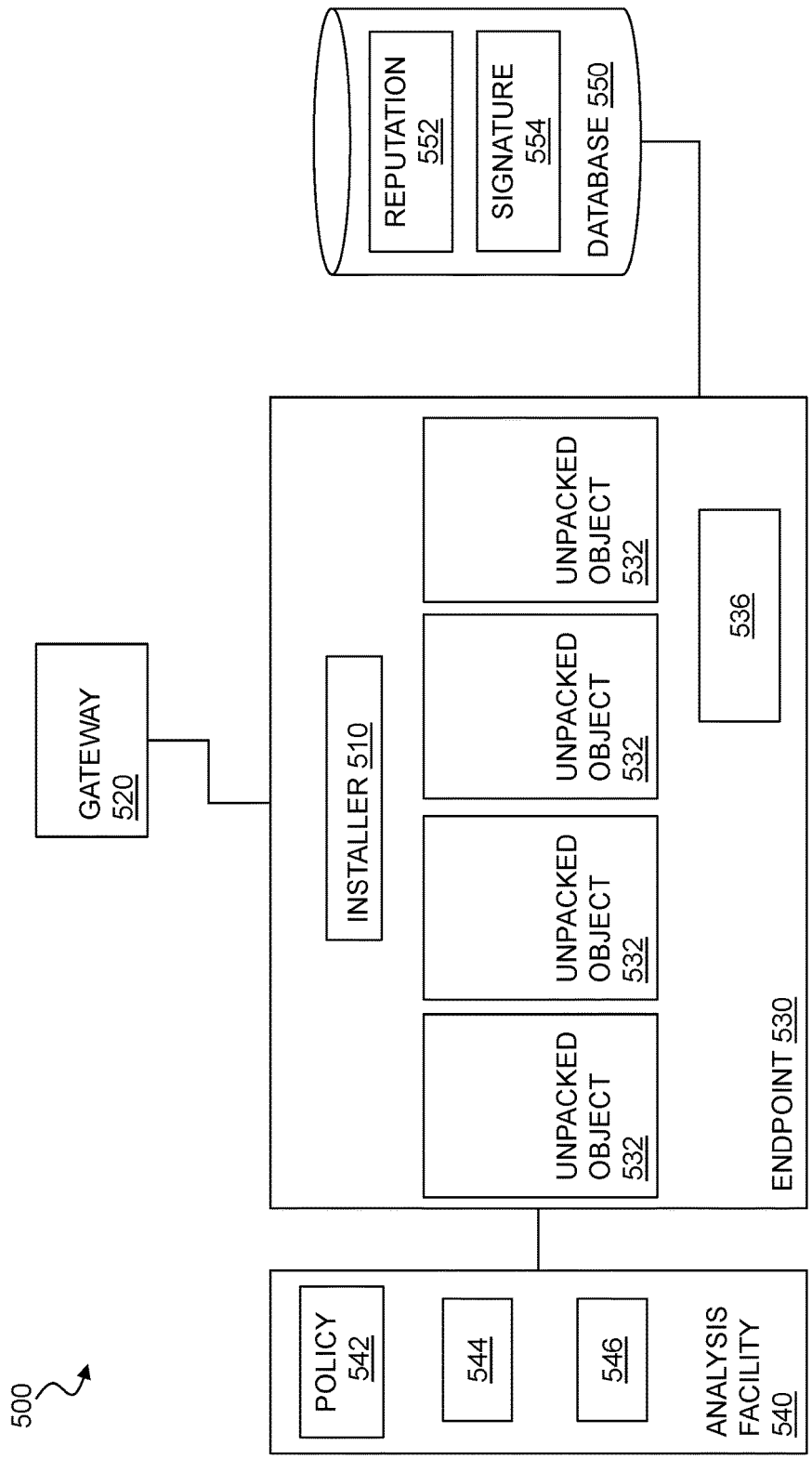
FIG. 5 illustrates a system for evaluating installers and installer payloads.

FIG. 5 illustrates a system for evaluating installers and installer payloads. The system 500 may include an installer 510, a gateway 520, an endpoint 530, an analysis facility 540, and a database 550.

As discussed above, e.g., with reference to FIGS. 3 and 4, the installer 510 may include a plurality of objects that may be unpacked, e.g., on the endpoint 530, to create a plurality of unpacked computer objects 532 that may be analyzed as described herein.

In an aspect, an analysis facility 540 performs the analysis of one or more of the installer 510 and each of the unpacked computer objects 532. Although shown as separate from the endpoint 530 in the figure, the analysis facility 540 or components thereof may instead be disposed on the endpoint 530 or included on element of the system 500, e.g., the gateway 520 or the like. The analysis facility 540 may include a scanning engine (e.g., a virus or malware detection engine) suitable for evaluating the reputation of individual software objects, a security facility, an enterprise network security resource, and so forth. For example, the analysis facility 540 may be the same or similar to one or more of the security resources described above with reference to FIG. 1.

The analysis facility 540 may store and implement a security policy 542, e.g., for the endpoint 530 (or for a plurality of endpoints 530), for a network, for other network resources, and so forth. The analysis facility 540 may be a local or remote facility relative to the endpoint 530, and may also or instead include a processor 544 and memory 546 including instructions to analyze one or more of the installer 510 and each of the unpacked computer objects 532. An analysis of each of the unpacked computer objects 532 may include an evaluation of compliance with the security policy 542.

As described in more detail in the processes below, the analysis facility 540 may apply an analysis (e.g., a static analysis) to one or more of the installer 510 and each of the unpacked computer objects 532 before allowing or blocking their execution on the endpoint 530. It will be understood that while static analysis provides one useful form of evaluation for compliance with the security policy 542, other techniques may also or instead be employed, e.g., behavioral analysis, dynamic analyses, sandbox execution and testing, and so forth.

The analysis may provide a reputation 552 for each of the unpacked computer objects 532 (and/or for the installer 510), which may then be stored in a memory 536 on the endpoint 530, in the memory 546 of the analysis facility 540, in a remote database 550, or any combination of these. The analysis may also or instead create a signature 554 for each of the unpacked computer objects, which may be similarly stored in any suitable location and used for signature-based analysis of reputation and the like. The analysis may also or instead include retrieving the reputations 552 or signatures 554 for one or more of the installer 510 and the unpacked computer objects 532 from a remote database, e.g., the database 550 shown in the figure.

The security policy 542 may allow or prevent the execution of certain installers 510 and certain unpacked computer objects included in their payloads. This may include, for example, whitelists or blacklists of known installers and computer objects, or reputations and signatures thereof. For example, the security policy 542 may include rules that allow installers or installer payloads that are provided by a known, trusted source (e.g., a trusted user, endpoint, network, company, vendor, and so forth). The rules may be more complex, for example, where originating from a trusted source is only one factor in determining whether to whitelist an installer or computer objects. In general, the security policy 542 may include any suitable rules, logic, prioritizing, etc., as desired to block/allow execution of certain installers and their payloads.

Although referred to herein in terms of 'security,' one skilled in the art will recognize that the security policy 542 may also or instead include other types of policies. For example, the security policy 542 may include a corporate or network policy having a list of approved installers, where installers outside of this list may not necessarily be security risks, but are otherwise unwanted in the network. Thus, the security policy 542 may intend to block malware and the like, while also blocking other types of unwanted installers/objects.

The database 550 may store reputations 552 and signatures 554 associated with installers 510 and/or computer objects. The reputations 552 and signatures 554 may include known reputations and signatures for use by one or more of the gateway 520, the endpoint 530, and an analysis facility 540 in analyzing one or more of the installer 510 and the unpacked computer objects 532, e.g., performing a static analysis. The reputations 552 and signatures 554 in the database 550 may be updated periodically as new information becomes available from the installer 510 and packed objects or from other resources such as remote testing facilities from which updates to definitions, signatures, and the like may be provided.

The database 550 may include a local database, e.g., at the endpoint 530 or at another participant in the system 500 (e.g., the analysis facility 540), or a remote database (e.g., a third-party reputation resource or the like). In an aspect, the database 550 is located in a cloud-based security facility or other network resource. The database 550 may store reputations 552, signatures 554, rules, policies, or any other pertinent information in a manner that facilitates their retrieval, e.g., by the endpoint 530 or another participant in the system 500 (e.g., the gateway 520 or analysis facility 540).

In general, the reputations 552 may include contextual information determined from one or more of the installer 510 (e.g., the publisher, a checksum, a cryptographic signature, metadata, etc.), a user that downloaded the installer 510, a server or component associated with the installer 510, or other information. The reputations 552 may relate to the trustworthiness of the installer 510, the computer objects, or an attribute thereof (e.g., the source, the behavior, an interaction between files/objects, and so forth). The reputations 552 may also or instead include a value regarding the installer's/object's compliance with a security policy 542 or the like. The reputations 552 may include lists of known sources of malware or known suspicious installers 510 and computer objects. The reputations 552 may be expressed in any suitable or useful level of granularity such as with discrete categories (e.g., trusted, untrusted, unknown, malicious, safe, allowed, blocked, run, don't run, etc.) or with a numerical score or other quantitative indicator. The reputations 552 may also be scaled. The reputations 552 may include a binary flag, a text string, or other machine-readable and/or human-readable identifier.

The reputations 552 may include an individual reputation, a reconciliation, or a combination of individual reputations, a combination of these reputations and other reputation information, or any combination of the foregoing, any of which may be generally useful in evaluating the reputation of software objects as contemplated herein.

The signatures 554 may include a unique identifier based on the content of the installer 510 or the computer objects. The signatures 554 may thus include without limitation a calculated or processed signature based on or more of a cryptographic hash function such as a message-digest (MD) algorithm hash (e.g., MD5 hash), a fingerprint, a feature vector, a certificate, a key, an application program interface (API) call, and so forth, and using any suitable information from or context for the corresponding object.

The reputations 552 and signatures 554 for the packed objects may also include or be based on any contextual information associated with each of the unpacked computer objects 532 such as a publisher, a cryptographic signature, a digital certificate, a source identifier (e.g., a URL, domain, or other identifier for a source from which an installer or object was retrieved), and so forth. The contextual information associated with each of the unpacked computer objects 532 may also or instead include broader contextual information including without limitation where the installer 510 was downloaded from, what running process (e.g., web browser) carried out the download of the installer 510, the user account under which that process was running, whether or not a system administrator had approved the installer 510 or object, and so forth. Many of the aforementioned types of information may only be available at the point when the installer 510 is downloaded and will have been lost by the time that the installer 510 or objects contained therein are being accessed or run. Thus the system 500 may usefully capture this information as one or more unique snapshots prior to unpacking, installation, and/or execution of the related software. More generally, at the point when an unpacked computer object is about to be opened and run, its signature may be calculated and looked up in the database 550.

Once an analysis is performed that determines that the installer 510 and the one or more unpacked computer objects 532 are to be allowed to execute on the endpoint 530, the installer 510 and/or unpacked computer objects 532 may be accessed or executed by the OS of the endpoint 530 for installing a computer program onto the endpoint 530.

Figure 6:
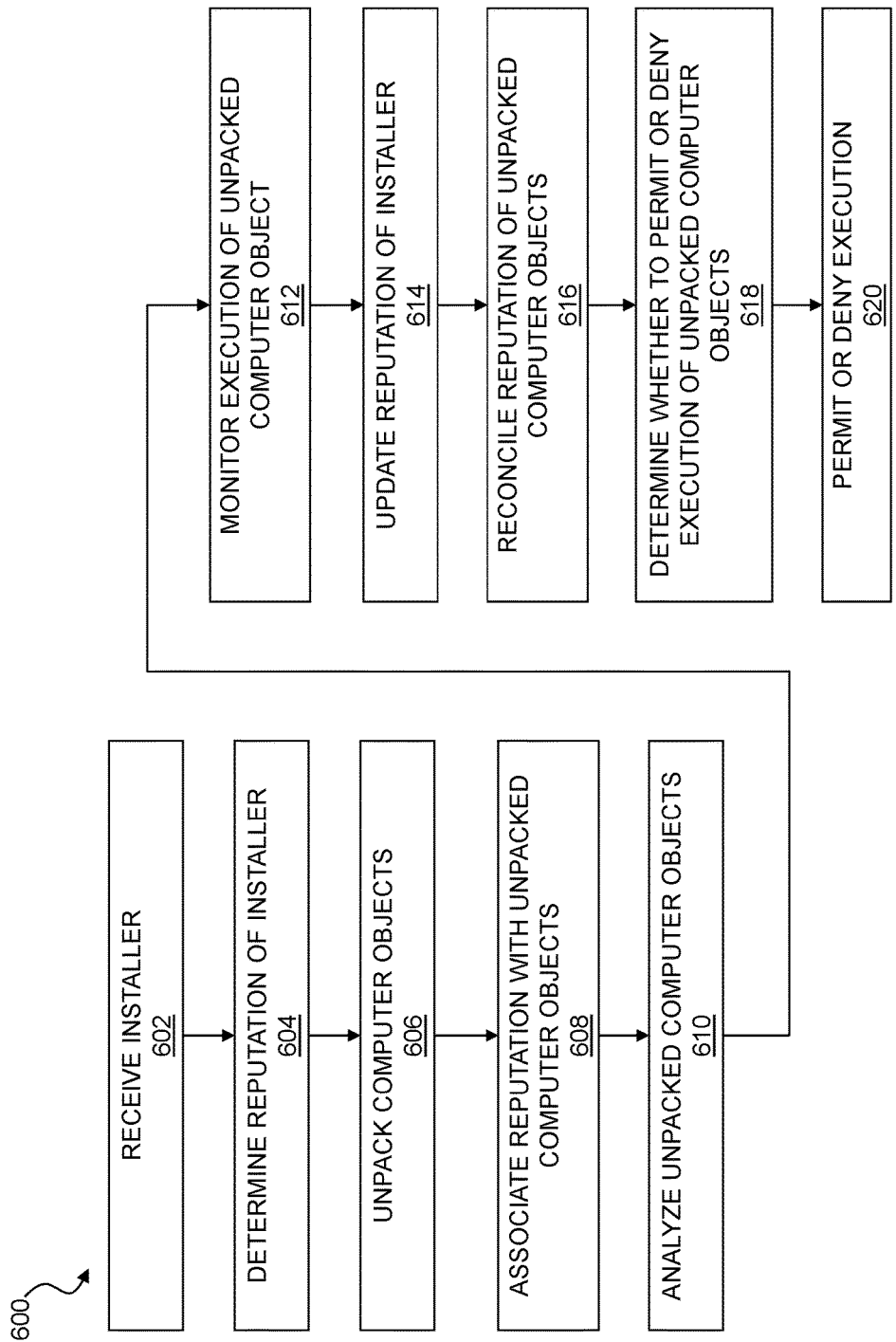
FIG. 6 is a flow chart of a method for evaluating computer objects supplied in an installer.

FIG. 6 is a flow chart of a method for evaluating computer objects supplied in an installer. In general, the method 600 may be used for evaluating an installer and its contents for unpacking and execution on a computing device. Specifically, computer objects may inherit the reputation of the installer from which they are supplied. In an aspect, the computer objects are allowed to run or install if the inherited reputation from the original installer is deemed acceptable for running/installing, e.g., even if the run or install operation is separate from those run by the original installer. In this manner, the inherited reputation from the installer may be the sole basis for the run/install decision for the computer objects, e.g., where the computer objects are not obvious threats. In another aspect, an additional analysis is performed on the computer objects before a decision is made as to whether the computer objects are allowed to run/install. Regardless, in implementations, a final determination about whether to execute the installer and/or its computer objects may be made based on the aforementioned analyses/reputations.

As shown in step 602, the method 600 may include receiving an installer. The installer may contain one or more packed computer objects, e.g., files, executables, applications, drivers, software, dynamic link libraries (DLL), other installers, and so forth. The installer may be received on an endpoint, or on a component/facility connected to the endpoint, e.g., a gateway or other network intermediary or the like.

As shown in step 604, the method 600 may include determining a reputation of the installer. In an aspect, determining the reputation of the installer includes determining a source of the installer and using the source to determine the reputation. The reputation of the installer may also or instead be determined through a reputation look-up, e.g., in a database of reputations as described herein or in a security facility or the like using installer metadata, signatures, or the like. Determining a reputation of the installer may also or instead be performed by an on-access filter or the like, e.g., by calculating a checksum or other information for the installer. The reputation of the installer may also or instead be determined based on information in the installer such as a publisher or other source identified in the installer, a cryptographic signature included with the installer or separately available, a checksum, and so forth. The reputation of the installer may include compliance with a security policy or any other useful reputation information.

Where a source of the installer is used to determine its reputation, the source may refer to a publisher, a website, an electric mail message, a network, a network resource, an endpoint, a removable drive, a user, an administrator, a vendor, a company, or the like. This may, for example, include a source explicitly identified by the installer, or an inferred source based, e.g., on the local or network resource providing the installer. In one aspect, a source of the installer may be identified via an anti-virus signature or the like, e.g., where the signature includes a checksum or other derivative representation of the installer that may be used to lookup the source in a signature database. The source may also or instead be determined with reference to a trusted third party using cryptographic techniques, such as through the use of a cryptographic signature, a certificate of a vendor or the like.

As shown in step 606, the method 600 may include unpacking each of the packed computer objects to provide one or more unpacked computer objects. In an aspect, the computer objects are unpacked on the endpoint. The objects may also or instead be unpacked at a gateway or threat management facility, in a sandbox, or in any other suitable location for evaluation. The unpacked computer objects may be temporarily extracted for evaluation and analysis (e.g., scanning).

As shown in step 608, the method 600 may include associating the reputation of the installer with each of the one or more unpacked computer objects as a first reputation. For example, if the reputation of the installer indicates the installer is whitelisted, this whitelisting may be inferred for one or more unpacked computer objects, at least temporarily until further analyses/updating takes place. In this manner, if a computer object is later queried on an endpoint, the reputation of any installers from which it is derived will be retrieved. In an aspect, further analyses on the one or more unpacked computer objects occurs only when the computer object or installer is about to be run on an endpoint, although a variety of more preemptive techniques may also or instead be employed. In another aspect, the reputation of the installer is associated with the computer objects before they are unpacked.

As shown in step 610, the method 600 may include analyzing each of the unpacked computer objects, e.g., to provide a second reputation. The analysis of each of the unpacked computer objects may evaluate compliance of each of the unpacked computer objects with a security policy. The analysis of each of the unpacked computer objects may also or instead evaluate each of the unpacked computer objects for one or more potential security threats. Analyzing each of the unpacked computer objects may include performing a static analysis of one or more of the unpacked computer objects, performing a behavioral or dynamic analysis of one or more of the unpacked computer objects, or performing any combination thereof.

Analyzing each of the unpacked computer objects may include determining a signature for one or more of the unpacked computer objects. The signature may include a checksum, a hash, or any other representative value or description. Analyzing each of the unpacked computer objects may include retrieving a second reputation from a remote database, e.g., performing a reputation look-up for each of the unpacked computer objects based on the signature or any other information. In addition to determination of a signature, analyzing each of the unpacked computer objects (e.g., static analysis of each of the unpacked computer objects) may also or instead include an evaluation of a publisher reputation for one or more of the unpacked computer objects, or an evaluation of a certificate or cryptographic signature associated with one of the unpacked computer objects.

As shown in step 612, the method 600 may include monitoring execution of each of the unpacked computer objects for possible security threats or compliance with the security policy. This may include a behavioral or dynamic analysis of one or more of the unpacked computer objects. This behavioral analysis of the unpacked computer objects may take place in a secure environment on the endpoint, e.g., a sandbox or the like, a virtualized environment, or outside of the endpoint. Analyzing each of the unpacked computer objects in this manner may also or instead include the use of an emulator that enables the endpoint or an analysis facility to safely run the installer or its computer objects through emulation techniques known in the art without exposing the endpoint to the installed software.

The outcome of the analyses of the unpacked computer objects (e.g., the reputation or signature) may be associated with computer objects already present on the endpoint. For example, when a computer object is identified and characterized in this way, the information may be used to update information for corresponding computer objects already present on a disc prior to the analyses (e.g., copies of the same computer objects in various locations on the disc that were present before the installer was received). In this manner, all of the known copies may then share the context information saved during analysis of the unpacked computer objects and this information may be used in a run/block decision on these copies as well. Similarly, this information may be used to update a remote database or other resource so that other instances of the software object can reflect any updated reputation information.

As shown in step 614, the method 600 may include updating the reputation of the installer. For example, in an aspect where the execution of one of the unpacked computer objects is monitored, the reputation of the installer may be updated when monitoring of the execution leads to a detection of a security threat or noncompliance with the security policy. Thus, the reputation of the installer may be updated based on a behavioral analysis. Similarly, the reputation of the installer may be updated based on a static analysis. For example, where it is found through a static analysis that the one or more of the unpacked computer objects (e.g., or a certain number or percentage of unpacked computer objects associated with an installer) do not comply with a security policy, the reputation of the installer may be updated to show that the installer also does not comply with the security policy (or likely does not comply with the security policy). Whether through a static or behavioral analysis (or both), in general, the method 300 may include updating the reputation of the installer when the second reputation indicates noncompliance with the security policy or detection of a security threat. This may include updating the reputation locally, and sharing updated information with remote resources such as the threat management facility described above.

As shown in step 616, the method 600 may include, for each of the one or more unpacked computer objects, reconciling the first reputation and the second reputation to a reconciled reputation, e.g., to determine whether to execute at least one of the unpacked computer objects on the endpoint. Reconciling the first reputation and the second reputation may include updating a whitelist/blacklist of installers/objects. Reconciling the first reputation and the second reputation may also or instead include updating an overall reputation, score, or otherwise for one or more of the unpacked computer objects. In an aspect, the first reputation and the second reputation may be reconciled for each of the unpacked computer objects individually. In an aspect, the first reputation and second reputation may be reconciled at the time of execution or installation. In this manner, if the computer object is accessed for execution, installation, or otherwise, e.g., at a later time by a different installer, the latest reputation information for the computer object may be used. The reputation of the whole installer may also or instead be reconciled after the aforementioned analyses (e.g., after each of the unpacked computer objects are analyzed). For example, the whole installer (and its contents) may be reconciled as acceptable or unacceptable based on the analyses.

By way of example, in some implementations, a first reputation score is assigned to a first reputation and a first weight is assigned to the first reputation score. A second reputation score may be assigned to the second reputation, where a second weight is assigned to the second reputation score. A combined score may be determined by multiplying the first weight by the first reputation score and adding that to the product of multiplying the second weight by the second reputation score. The first weight may be assigned based on a confidence in the first reputation and the second weight may be assigned based on a confidence in the second reputation. By way of example, if the first reputation or the second reputation is based on information that is more certain, the weight will be higher.

For example, in some implementations, each computer object in a payload may have a different reputation, and the lowest reputation is used to combine with the installer. In other implementations, the average of the computer objects in a payload may be used.

In implementations, reconciling the first reputation and the second reputation includes prioritizing the first reputation of the installer when the first reputation indicates a trusted vendor. For example, if the first reputation indicates a trusted vendor, the computer objects may be allowed to run (e.g., an executable runs, a DLL is loaded, an installer runs, a file is opened, etc.) as long as the computer object is clearly not malicious, e.g., based on a static analysis. This may be accomplished, for example, with a larger weight for a reputation associated with a trusted vendor.

In implementations, reconciling the first reputation and the second reputation includes prioritizing the second reputation of one of the unpacked objects when the second reputation indicates known malicious code. For example, a malicious computer object may be blocked regardless of the reputation of its installer, e.g., even if the installer comes from a trusted source or is otherwise tagged to be allowed to run. Similarly, a computer object determined not to be malicious (or not determined to be malicious) but is otherwise unknown may be allowed to run if the reputation of the installer shows that the installer should be allowed to run. Further, the reputations of the installers/objects may be updated based on reputations of their contents. For example, a previously trusted installer may be revised to be untrusted if it is found to be associated with a malicious computer object, or vice-versa. This may be accomplished with a larger weight, for example, for a reputation associated with a malicious computer object.

As shown in step 618, the method 600 may include providing a determination regarding whether to permit or deny execution of each of the one or more unpacked computer objects on the endpoint based on the reconciled reputation. In other words, reconciling the first reputation and the second reputation may lead to a determination of whether one or more of the unpacked computer objects is acceptable or unacceptable, blocked or unblocked, and so on.

As shown in step 620, the method 600 may include, based on the determination, permitting or denying execution of each of the one or more unpacked computer objects on the endpoint.

After the analyses detailed above, all of the pieces of information saved with respect to the installer or the one or more unpacked computer objects may be weighted and combined using suitable decision logic and reputation scoring. This can then compared against a security policy, e.g., an application control policy currently in force on the endpoint. Any such rules to implement suitable decision logic are intended to fall within the scope of this disclosure. Numerous techniques are known in the art for combining multiple data points or items of information, any of which may be usefully employed herein to reconcile multiple items of reputation information such as those described above. This may include techniques that favorably weight static analysis or behavioral analysis, that favorably weight cryptographically verified information, that favorably weight publisher or other source information, or that apply various filters, business rules, artificial intelligence, machine learning algorithms, or the like to more accurately identify a current reputation for an object delivered through an installer. Thus more generally any weighted, unweighted or other technique for reconciling multiple items of reputation information may be used to resolve a final reputation for the installer and/or objects packed therein. The first reputation, second reputation, reconciled reputation, weighted or scored reputation, and the like, may be stored in a database where it may be accessed for later retrieval and use. The database may be continually updated based on new analyses.

FIG. 7 is a flow chart of a method for evaluating computer objects supplied in an installer. In general, the method 700 may be used for evaluating an installer and its contents for unpacking and execution on a computing device. Specifically, in this method 700, the installer may inherit the reputation of its computer objects after one or more analyses are performed on the unpacked computer objects.

As shown in step 702, the method 700 may include receiving an installer. The installer may, for example, include a payload of one or more software objects along with a software wrapper for unpacking, decrypting, installing, or otherwise unloading the payload for use on the endpoint. Receiving the installer may include downloading the installer to an endpoint from a remote network location, copying the installer from a disk or USB drive, or otherwise retrieving the installer onto the endpoint.

As shown in step 704, the method 700 may include determining a reputation for the installer. This may, for example, include determining the reputation using any of the techniques described above. For example, this may include calculating a signature for the installer, or any other derivative description that may be used to lookup the reputation using a local or remote resource. This may also or instead including evaluating a source of the installer, which may include a network address or other description of a location that the installer was retrieved from, an explicit publisher or other source provided by the installer, or a publisher identified with reference to a trusted third party using, e.g., a cryptographic signature, certificate, or the like.

As shown in step 706, the method 700 may include determining a second reputation of a payload of the installer. This may, for example, include determining the reputation using any of the techniques described above. For example, this may include calculating a signature for each software object in the payload, or any other derivative description that may be used to lookup the reputation of each software object using a local or remote resource. This may also or instead including evaluating a source of each of the software objects in the payload, which may include a network address or other description of a location that the software objects (collectively or individually) were obtained from, an explicit publisher or other source provided by each software object, or a publisher for each software object identified with reference to a trusted third party using, e.g., a cryptographic signature, certificate, or the like. In one aspect, this may include behavioral analysis of one or more of the software objects, either alone or collectively, which may be performed on the endpoint, or in a sandbox or other safe location where the endpoint is not exposed to the executing software. It will be appreciated that, as described above, this reputation information for individual software objects in the payload may be evaluated before unpacking, after unpacking, or some combination of these.

As shown in step 708, the method 700 may include updating the first reputation of the installer based on the second reputation of the payload for the installer. This may include changing the first reputation to match the second reputation, or this may include a reconciliation using, e.g., any of the techniques described above.

As shown in step 710, the method 700 may include acting on the installer according to the updated reputation. Thus, for example, a go/no-go decision may be made for the installer based on the updated reputation. This information may also be used to update a global data store at a threat management facility or the like so that other instances of the installer may be correctly evaluated before unpacking of objects contained therein.

Another aspect includes a computer program product comprising non-transitory computer executable code embodied in a non-transitory computer readable medium that, when executing on one or more computing devices, performs the steps of: receiving an installer containing one or more packed computer objects; determining a first reputation of the installer; determining a second reputation of a payload of the installer; and updating the first reputation of the installer based on the second reputation of the payload for the installer.

In an aspect, one or more of the unpacked objects includes a second installer. When this occurs, the methods described herein (e.g., methods 600, 700), or any other techniques, may be performed for the second installer, e.g., any steps may each be performed on the second installer and its corresponding payload. For example, a third reputation may be determined/retrieved for the second installer, and the contents of the second installer may be unpacked to undergo the analyses described herein. A fourth reputation may be determined for a payload of the second installer. A combined reputation may be determined for the third reputation and the fourth reputation. The combined reputation may then be combined with the reputation for the first installer, the second installer, and so on and so forth. Weights may be assigned to each reputation.

The above implementations may be used as an improved and simplified mechanism for making a 'run/block' decision for installers and their components. For example, when the reconciled reputation for each of the one or more unpacked computer objects indicates that the one or more unpacked computer objects are not malicious or otherwise comply with a network or security policy, an implementation may determine that each of the unpacked computer objects should be allowed to run on the endpoint. Similarly, when the reconciled reputation for each of the one or more unpacked computer objects indicates that the one or more unpacked computer objects are malicious, are suspected to be malicious, or otherwise do not comply with a network or security policy, an implementation may determine that each of the unpacked computer objects should be blocked from running on the endpoint. An installer may similarly be allowed to run on an endpoint when the reconciled reputation of its computer objects shows that they not malicious or otherwise comply with a network or security policy. Also, an installer may be blocked from running on an endpoint when the reconciled reputation of its computer objects shows that they are malicious, are suspected to be malicious, or otherwise do not comply with a network or security policy. In an implementation, when only one computer object of an installer has a reconciled reputation that indicates it is malicious, or it is suspected to be malicious, or it otherwise does not comply with a network or security policy, then the installer and all computer objects associated therewith may be blocked on the endpoint. In another aspect, just the malicious computer object is blocked.

Additionally, implementations may be used to track and measure the spread of a component across a network—e.g., if an object's signature is reported to a central location, e.g., uploaded to a database, then it may be tracked and measured. Implementations may also or instead share reputation information with other endpoints—e.g., where the reputation information is uploaded to a databased shared by computers on a network.

The techniques described herein may provide for a run/block decision that is more sophisticated than a simple malware scan and that is less likely to be incorrect because it is based on more than just a simple 'known malware/don't know' decision. Also, information saved pertaining to the analyzed computer objects may be compared against a refined and detailed application control policy, which may be updated if more context/reputation information becomes available (e.g., updated from a cloud). The techniques may also be less prone to false negatives, as computer objects that were not detected during an original scan (e.g., due to being deliberately obfuscated or due to limitations of the analysis facility or scanning engine) may not appear in the database and as such they will not be considered as whitelisted.

In an aspect, a computer program product comprising non-transitory computer executable code embodied in a non-transitory computer readable medium that, when executing on one or more computing devices, performs any or all of the steps discussed above.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In an aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In an aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In an aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method for evaluating computer objects supplied in an installer for unpacking and execution on a computing device, the method comprising:
receiving an installer on an endpoint, the installer containing one or more packed computer objects;
determining a reputation of the installer;
unpacking each of the packed computer objects on the endpoint to provide one or more unpacked computer objects, wherein unpacking includes creating a signature for each of the packed computer objects before unpacking;
associating the reputation of the installer with each of the one or more unpacked computer objects such that the reputation of the installer is inherited as a first reputation of each of the one or more unpacked computer objects;
in a secure environment, analyzing each of the unpacked computer objects to evaluate compliance with a security policy and provide a second reputation, wherein analyzing each of the unpacked computer objects includes looking up information using the signature for one or more of the packed computer objects;
for each of the one or more unpacked computer objects, reconciling the first reputation and the second reputation to a reconciled reputation, the reconciled reputation based on weighting each of the first reputation and the second reputation according to confidence in the respective reputation;
providing a determination regarding whether to permit or deny execution of each of the one or more unpacked computer objects on the endpoint based on the reconciled reputation; and
based on the determination, permitting or denying execution of each of the one or more unpacked computer objects on the endpoint.

2. The method of claim 1 wherein analyzing each of the unpacked computer objects includes performing a static analysis of one or more of the unpacked computer objects.

3. The method of claim 2 wherein analyzing each of the unpacked computer objects includes determining a signature for one or more of the unpacked computer objects.

4. The method of claim 3 wherein the signature includes a checksum.

5. The method of claim 2 wherein analyzing each of the unpacked computer objects includes retrieving the second reputation from a remote database.

6. The method of claim 2 wherein analyzing each of the unpacked computer objects includes an evaluation of a publisher reputation for one or more of the unpacked computer objects.

7. The method of claim 2 wherein analyzing each of the unpacked computer objects includes an evaluation of a certificate or cryptographic signature associated with one or more of the unpacked computer objects.

8. The method of claim 1 further comprising monitoring execution of each of the unpacked computer objects for possible security threats or compliance with the security policy.

9. The method of claim 8 further comprising updating the reputation of the installer when monitoring execution leads to a detection of a security threat or noncompliance with the security policy.

10. The method of claim 8 wherein monitoring execution of each of the unpacked computer objects takes place in at least one of a sandboxed environment, a virtualized environment, or an emulated environment.

11. The method of claim 1 further comprising updating the reputation of the installer when the second reputation indicates noncompliance with the security policy or detection of a security threat.

12. The method of claim 1 wherein determining the reputation of the installer includes determining a source of the installer and using the source to determine the reputation.

13. The method of claim 12 wherein the source of the installer is determined from one or more of a signature, a certificate, and a location on a network.

14. The method of claim 1 wherein reconciling the first reputation and the second reputation includes prioritizing the first reputation of the installer when the first reputation indicates a trusted vendor.

15. The method of claim 1 wherein reconciling the first reputation and the second reputation includes prioritizing the second reputation of one of the unpacked computer objects when the second reputation indicates known malicious code.

16. The method of claim 1 wherein one of the unpacked computer objects is a second installer.

17. A computer program product comprising non-transitory computer executable code embodied in a non-transitory computer readable medium that, when executing on one or more computing devices, performs the steps of:
receiving, on an endpoint, an installer containing one or more packed computer objects;
determining a reputation of the installer;
unpacking each of the packed computer objects to provide one or more unpacked computer objects, wherein unpacking includes creating a signature for each of the packed computer objects before unpacking;
associating the reputation of the installer with each of the one or more unpacked computer objects such that the reputation of the installer is inherited as a first reputation of each of the one or more unpacked computer objects;
in a secure environment, analyzing each of the unpacked computer objects to evaluate compliance with a security policy and provide a second reputation, wherein analyzing each of the unpacked computer objects includes looking up information using the signature for one or more of the packed computer objects;
for each of the one or more unpacked computer objects, reconciling the first reputation and the second reputation to a reconciled reputation, the reconciled reputation based on weighting each of the first reputation and the second reputation according to confidence in the respective reputation;
providing a determination regarding whether to permit or deny execution of each of the one or more unpacked computer objects on a device based on the reconciled reputation; and
based on the determination, permitting or denying execution of each of the one or more unpacked computer objects on the device.

18. A system for evaluating computer objects supplied in an installer for unpacking and execution on a computing device, the system comprising:
a processor; and
a non-transitory computer-readable medium comprising computer executable instructions, the computer executable instructions when executing on the processor performs operations comprising
receiving, on the computing device, an installer containing one or more packed computer objects;
determining a reputation of the installer;

unpacking each of the packed computer objects to provide one or more unpacked computer objects, wherein unpacking includes creating a signature for each of the packed computer objects before unpacking;

associating the reputation of the installer with each of the one or more unpacked computer objects such that the reputation of the installer is inherited as a first reputation of each of the one or more unpacked computer objects;

in a secure environment, determining a second reputation of the one or more unpacked computer objects, wherein determining the second reputation of the one or more unpacked computer objects includes looking up information using the signature for one or more of the packed computer objects; and for each of the one or more unpacked computer objects, reconciling the first reputation and the second reputation to a reconciled reputation, the reconciled reputation based on weighting each of the first reputation and the second reputation according to confidence in the respective reputation;

providing a determination regarding whether to permit or deny execution of each of the one or more unpacked computer objects on the computing device based on the reconciled reputation; and based on the determination, permitting or denying execution of each of the one or more unpacked computer objects on the computing device.

19. The system of claim 18 wherein determining the first reputation includes one or more of calculating a signature for the installer and evaluating a source of the installer, and wherein determining the second reputation includes one or more of calculating a signature for the one or more packed computer objects, calculating a signature for the one or more unpacked computer objects, performing a behavior analysis of one or more unpacked computer objects, and executing the one or more unpacked computer objects in a sandbox.

* * * * *